UNITED STATES PATENT OFFICE.

HORATIO KEELER, OF CHICAGO, ILLINOIS.

PROCESS OF PURIFYING MOLTEN IRON AND STEEL.

SPECIFICATION forming part of Letters Patent No. 298,983, dated May 20, 1884.

Application filed December 1, 1882. (Specimens.)

*To all whom it may concern:*

Be it known that I, HORATIO KEELER, a citizen of the United States, residing at Chicago, in the county of Cook and State of Illinois, have invented a new and useful Process of Purifying Molton Iron and Steel for the Purpose of Raising their Qualities, of which the following is a specification.

In carrying out this method I proceed as follows: I place in a suitable vessel pure copper filings and pulverized resin in the proportions of pure copper one-half ($\frac{1}{2}$) ounce and pulverized resin four and one-half ($4\frac{1}{2}$) ounces. The compound of copper and resin is united with the iron or steel by mixing in a ladle or other proper vessel while the iron or steel is in a molten state as it comes from the melting-furnace. The copper and resin are thereby dissolved and absorbed in the molten mass.

I have found by actual experiment that by treating the metals to form one-tenth of one per cent. to two per cent. of this mixture the grade and quality of both iron and steel are improved.

I know from the frequent experiments I have made that by my method of treatment the phosphorus is eliminated from the metals treated and carbon is added thereto, thereby improving the quality and grade of the metal.

I am aware that copper has been used heretofore in treating iron and steel, and also that resin has been combined with soda to prevent blistering. My invention does not cover the use of either of these, broadly, when not united.

Having thus described my invention, what I claim as new, and desire to secure by Letters Patent, is—

The herein-described method of improving the grade and quality of iron and steel, consisting in combining them while in a molten state with a mixture formed of pure copper filings and pulverized resin in the proportions hereinbefore mentioned, substantially as specified.

HORATIO KEELER.

Witnesses:
GILBERT MONTAGUE,
WM. D. GATES.